United States Patent
Wu

(10) Patent No.: US 6,573,828 B2
(45) Date of Patent: Jun. 3, 2003

(54) LOW-PRESSURE TESTING DEVICE FOR AN AUTOMOBILE TIRE

(76) Inventor: Shu-Chin Wu, No. 15, Lane 35, Chung-Sun St., Hsi-Chih City, Taipei Hsien (TW)

( * ) Notice: Subject to any disclaimer, the term of this patent is extended or adjusted under 35 U.S.C. 154(b) by 89 days.

(21) Appl. No.: 09/969,687

(22) Filed: Oct. 4, 2001

(65) Prior Publication Data

US 2002/0113693 A1 Aug. 22, 2002

(30) Foreign Application Priority Data

Feb. 19, 2001 (TW) ..................... 90202408 U

(51) Int. Cl.[7] .............................................. B60C 23/00
(52) U.S. Cl. ................. 340/443; 340/442; 73/146.2
(58) Field of Search ............................. 340/442, 443, 340/445, 447; 73/146, 146.2; 33/203.12, 203.14

(56) References Cited

U.S. PATENT DOCUMENTS

| | | | | |
|---|---|---|---|---|
| 5,396,817 A | * | 3/1995 | Rosensweig | ............... 73/146.2 |
| 5,445,020 A | * | 8/1995 | Rosensweig | ............... 73/146.2 |
| 5,522,144 A | * | 6/1996 | Smoorenburg | ........... 33/203.14 |
| 5,942,681 A | * | 8/1999 | Vollenweider et al. | ...... 73/146.2 |

* cited by examiner

*Primary Examiner*—Van Trieu
(74) *Attorney, Agent, or Firm*—Bacon & Thomas, PLLC

(57) ABSTRACT

A low-pressure testing device for an automobile tire has a base, a warning device, two parallel separated resilient tubes The base is firmly placed on the ground. The warning device is mounted on one end of the base and has a first switch, a second switch and a warning circuit. Each of the parallel separated resilient tubes has a first closed end and a second end connected to the first switch or the second switch, as appropriate. When the two tubes are pressed simultaneously, the first and second switches close the warning circuit to sound an alarm.

10 Claims, 8 Drawing Sheets

LOW-PRESSURE TESTING DEVICE FOR AN AUTOMOBILE TIRE

BACKGROUND OF THE INVENTION

1. Field of the Invention

The present invention relates to a low-pressure testing device, and more particularly to a low-pressure testing device for an automobile tire. The testing device is able to easily detect whether the pressure inside an automobile tire is within the standard range so that the user will not have to go through a series of repetition of troublesome and time wasting process.

2. Description of Related Art

Tire pressure must be within a certain range to ensure safe and efficient driving conditions for a vehicle. Therefore, tire pressure often needs to be checked. Most drivers use a visual inspection to determine if a tire is slack, which is effective only if tire pressure is quite low. If the driver uses a tire gauge to check the tire pressure, the driver has to check each tire by removing the valve cap, pressing the tire gauge on the valve and replacing the valve cap, which is quite troublesome and time consuming.

To overcome the shortcomings, the present invention tends to provide an improved low pressure testing device to mitigate and obviate the aforementioned problems.

SUMMARY OF THE INVENTION

The primary objective of the invention is to provide a low-pressure testing device for an automobile tire so a driver can easily determine whether the tire pressure is within the standard range.

The low pressure testing device has a base, two resilient tubes and two sleeves. Each of the resilient tubes has a closed first end and a second end. The second ends are respectively connected to a first pressure switch and a second pressure switch in the base. The two sleeves are mounted on the base to hold the two resilient tubes in position. The two tubes are filled with air so that when the tubes are pressed, the air inside the tubes is compressed and activates the pressure switches that close a warning circuit inside the base to sound an alarm.

Other objects, advantages and novel features of the invention will become more apparent from the following detailed description when taken in conjunction with the accompanying drawings.

DETAILED DESCRIPTION OF THE PREFERRED EMBODIMENT

Figure 1:
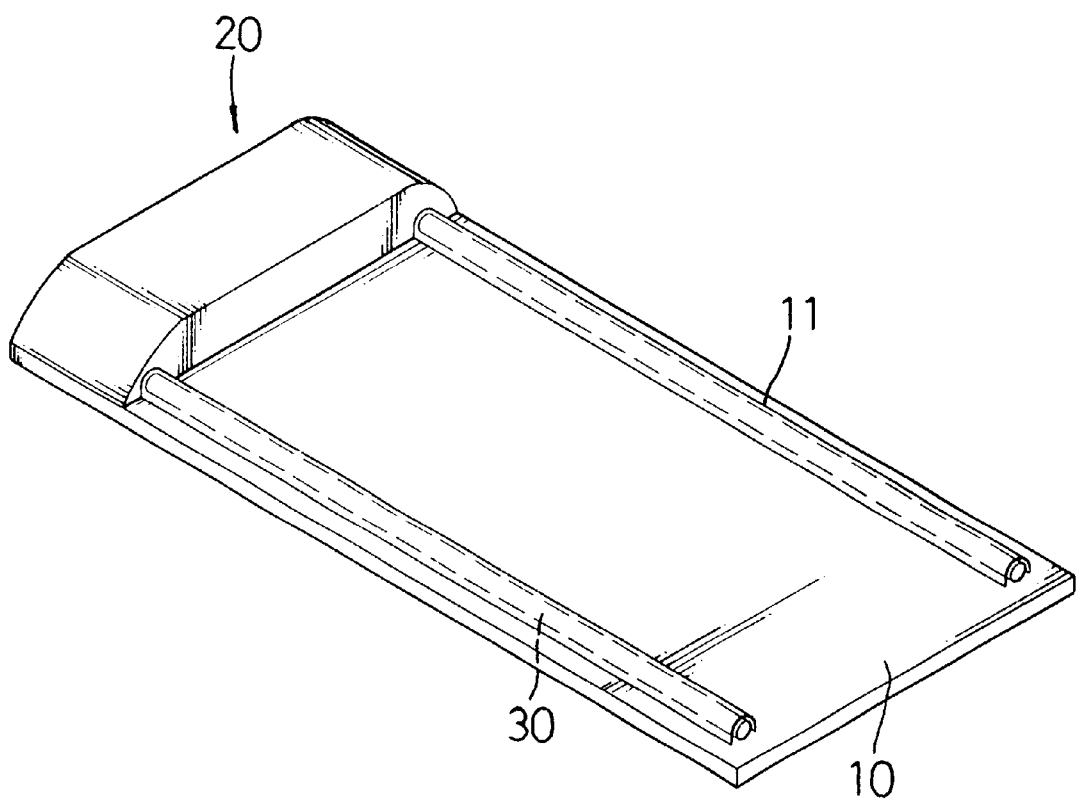
FIG. 1 is a perspective view of the low-pressure testing device in accordance with the present invention.
Figure 4:
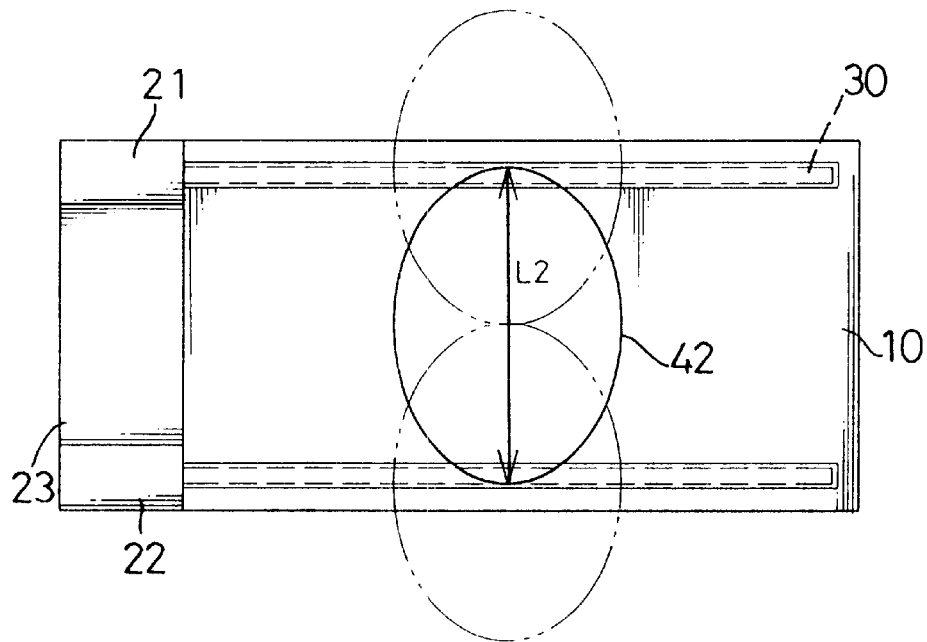
FIG. 4 is a top plan view of the low-pressure testing device in FIG. 1 with the footprint of a tire with low air pressure.
Figure 2:
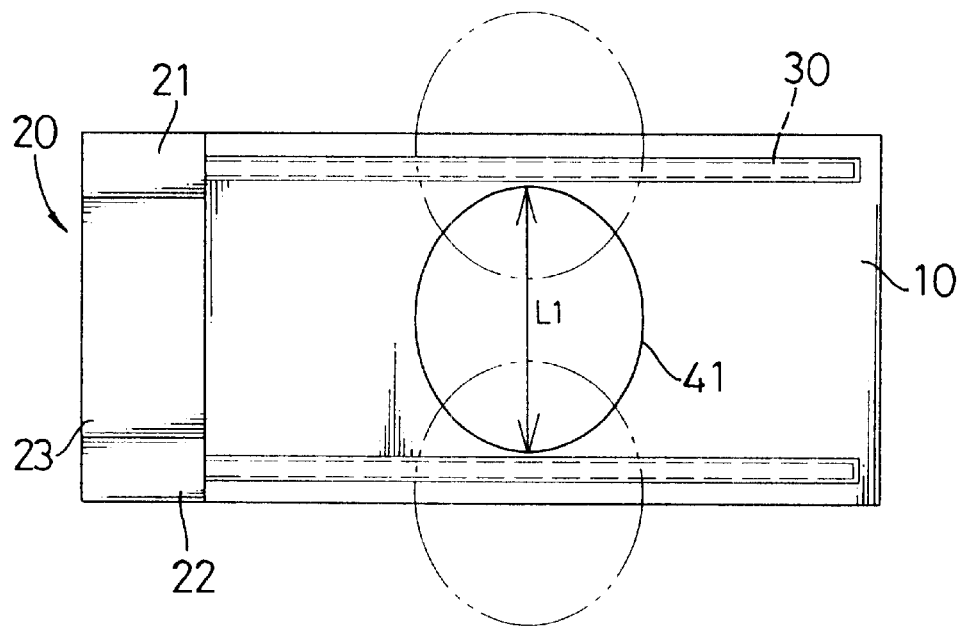
FIG. 2 is a top plan view of the low-pressure testing device in FIG. 1 with the footprint of a properly inflated tire.

With reference to FIG. 1 and FIG. 2, the low-pressure testing device in accordance with the present invention has a base (10), a warning device (20) and two resilient sleeves (30).

The base (10) has a long front and rear edge and two shorter end edges and is flat and rectangular so that the base (10) sits firmly on a level surface. The warning device (20) is mounted on one end of the base (10) and has a first pressure switch (21) and a second pressure switch (22) mounted inside the warning device (20). The two resilient sleeves (30) are parallel to each other with one resilient sleeve (30) mounted along the front edge of the base (10) and the other resilient sleeve (30) mounted along the rear edge of the base (10). A resilient tube (11) is mounted in each resilient sleeve (30) such that the resilient tubes (11) are also parallel to one another. Each tube (11) has a closed end and another end connected to the corresponding pressure switch (21, 22). The sleeves (30) hold the two resilient tubes (11) in position on the base (10). The two resilient tubes (11) are filled with air such that when either one of the two resilient tubes (11) is pressed, the air inside the tube (11) will be compressed and will activate the corresponding pressure switches (21, 22).

Figure 2A:
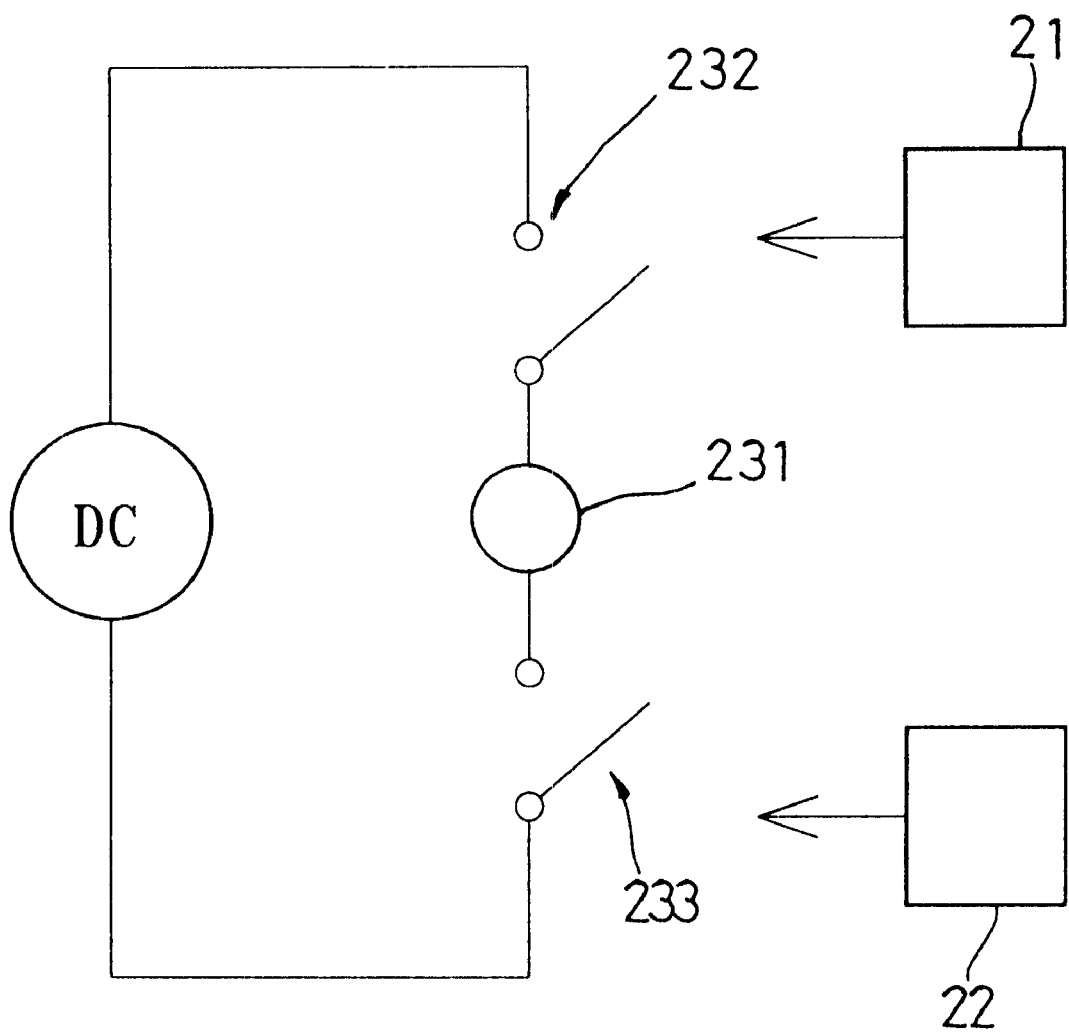
FIG. 2A is a circuit diagram of the warning circuit in the low-pressure testing device in FIG. 1.
Figure 3:
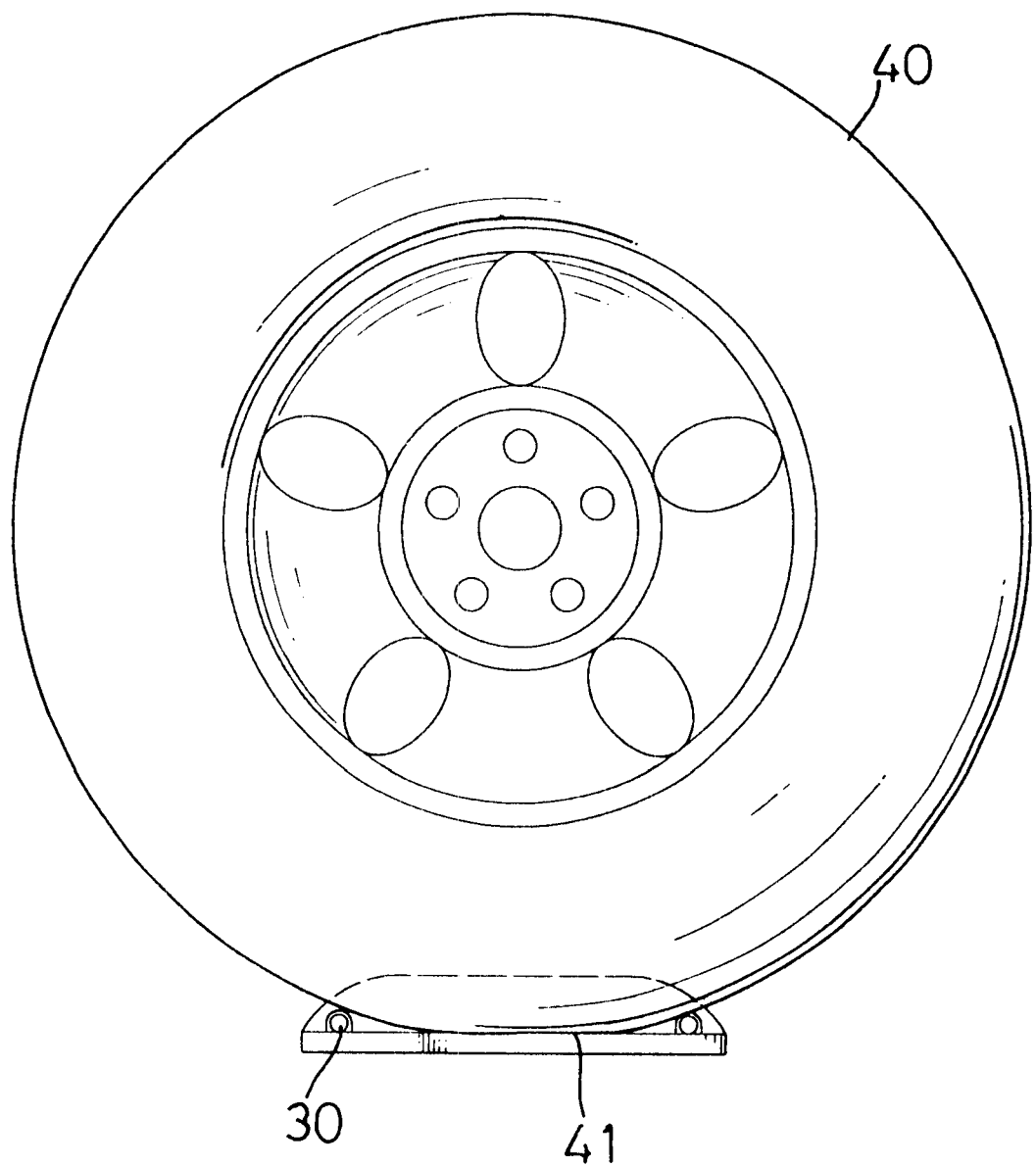
FIG. 3 is a side plan view of the low-pressure testing device in FIG. 2 with a properly inflated tire on the device.
Figure 5:
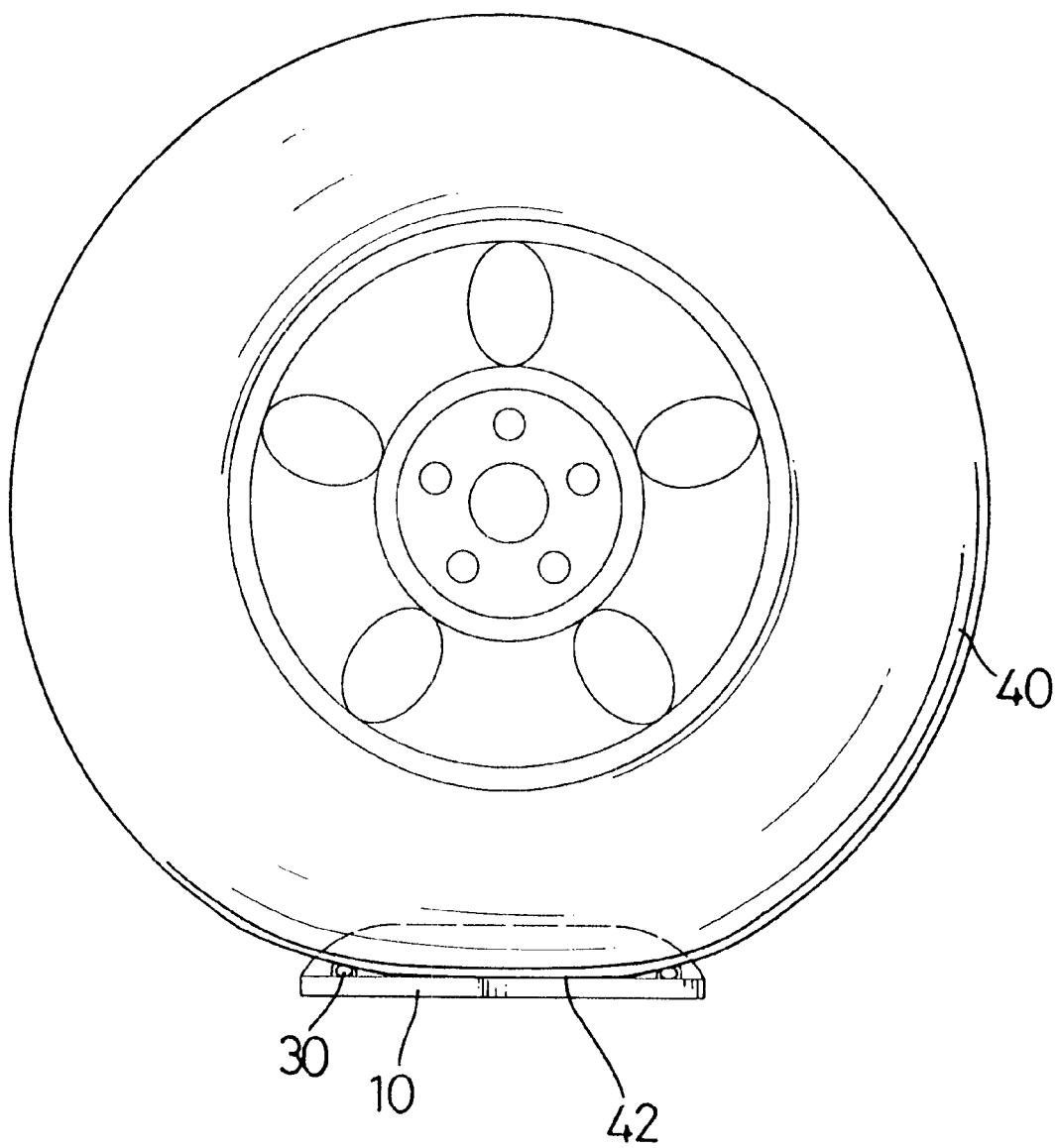
FIG. 5 is a side plan view of the low-pressure testing device in FIG. 4 with a tire with low air pressure on the device.

With reference to FIG. 2A and still taking FIG. 2 for reference, a warning circuit (23) is mounted inside the warning device (20). The warning circuit (23) is connected to a power source (i.e., a DC power source) and has a buzzer (231) with two normally open switches (232, 233) arranged on either side of and connected to the buzzer (231). The two pressure switches (21, 22) selectively activate the corresponding switch (232, 233). Thus, when either one of the pressure switches (21, 22) is activated, one of the corresponding switches (232, 233) is accordingly activated. When both switches (232, 233) are activated simultaneously, the electrical circuit is closed and the buzzer (231) activates and sends out an alarm to warn the driver of low air pressure in the corresponding tire.

With reference to FIGS. 2, 2A to 5, the parallel the resilient tubes (11) are separated by a fixed distance. Though tires have different sizes and pressure requirements, each tire (40) has a standard pressure range. When the tire pressure is within the standard range, a tire footprint (41) has a longitudinal length L1 that is shorter than the distance between the two parallel resilient tubes (11) such that the warning circuit (23) will not be activated. However, when the tire pressure of the tire (40) is lower than standard, the tire footprint (42) will be larger than that of the footprint (41) of the properly inflated tire, and a longitudinal length L2 of the tire footprint (42) is longer than the distance between the two resilient tubes (11). The tire (40) simultaneously presses both resilient tubes (11). When the weight of the tire (40) (or the weight of the automobile) presses the tubes (11), the air inside the tubes (11) is compressed and activates both pressure switches (21, 22) that close the electrical switches (232, 233) close the warning circuit (23). When the warning circuit (23) is closed, the buzzer (231) sounds an alarm to warn the driver that the tire pressure is below standard.

Figure 6:
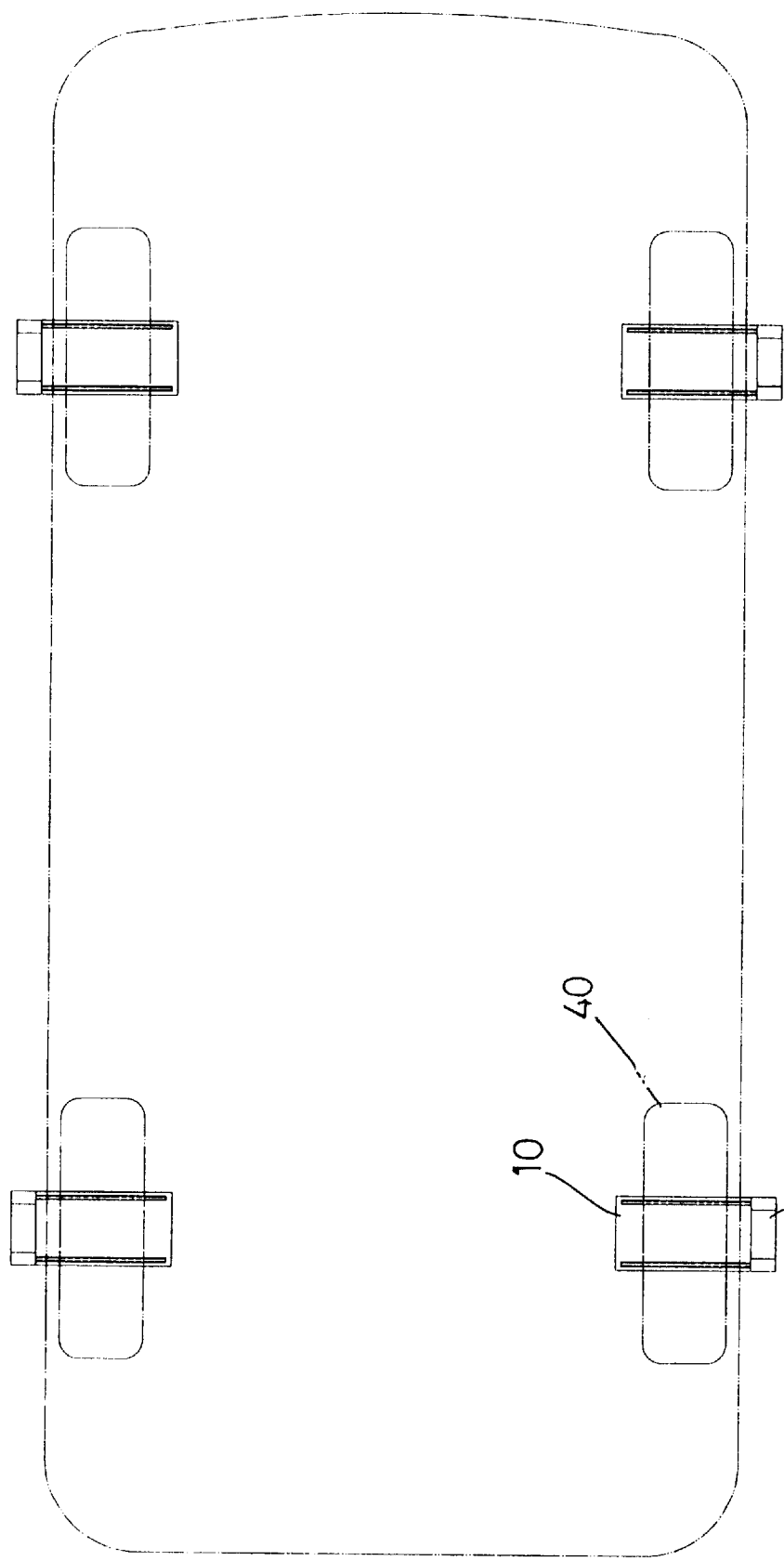
FIG. 6 is an operational top plan view of the low-pressure testing devices in use.

To simultaneously check the air pressure in all four tires, the driver must park the car on a flat surface such as a parking lot, place a low-pressure testing device in front of each tire (40) and then move the automobile to place each tire (40) on top of the corresponding base (10) as shown in FIG. 6.

Figure 7:
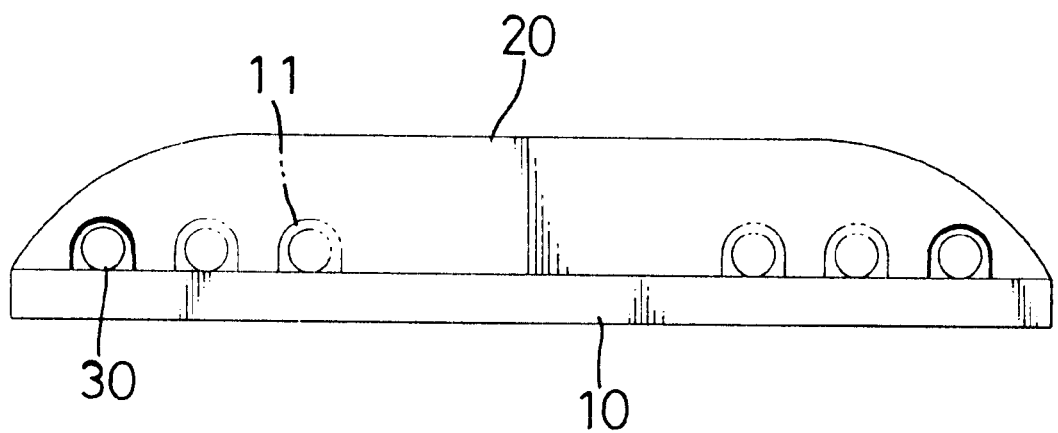
FIG. 7 is a side plan view of a second embodiment of the low-pressure testing device in accordance with the present invention.

With reference to FIG. 7, to accommodate different tire dimensions, multiple parallel resilient sleeves (30) are mounted on top of the base (10) and two tubes (11) are inserted into the appropriate sleeves (30) so that the user is able to employ the device with all kinds of tires.

Figure 8:
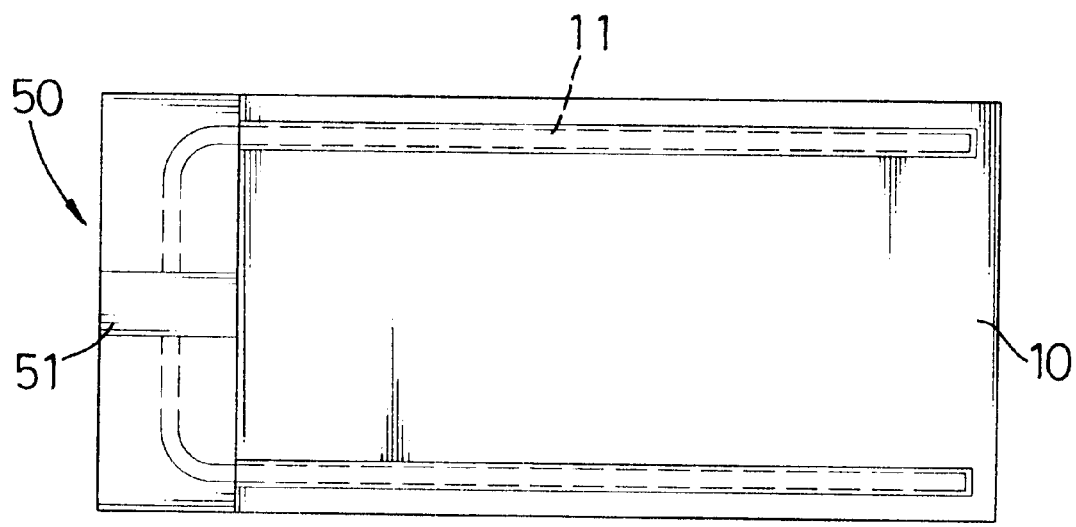
FIG. 8 is a top plan view of a third embodiment of the low-pressure testing device in accordance with the present invention.

With reference to FIG. 8, another embodiment of the low-pressure testing device uses only one pressure switch (51). Only one switch (51) is mounted in the warning circuit (23) with the buzzer (231). When both tubes (11) are pressed, the air inside both tubes (11) is compressed and will activate the pressure switch (51) and close the warning circuit (23) so that the buzzer (231) sounds a warning to indicate that the tire pressure is below standard.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A low-pressure testing device for an automobile tire, the low-pressure testing device consisting of:
    a base with a long front and rear edge and two shorter end edges firmly placed on the ground;
    a warning device mounted on one end of the base and having a first switch, a second switch and a warning circuit; and
    two separated resilient tubes each of which has a first closed end and a second end connected to a corresponding one of the first switch and the second switch;
    whereby when the two tubes are pressed simultaneously, the first and second switches close the warning circuit to sound an alarm.

2. The low-pressure testing device as claimed in claim 1, wherein the resilient tubes are filled with air and the first and second switches are pressure switches so that when the resilient tubes are pressed simultaneously, the air inside the resilient tubes is compressed and activates the first and second switches to close the warning circuit.

3. The low-pressure testing device as claimed in claim 2 further comprising multiple parallel resilient sleeves mounted on top of the base to hold the two resilient tubes.

4. The low-pressure testing device as claimed in claim 1 further comprising multiple resilient sleeves mounted in parallel on top of the base to hold the two resilient tubes.

5. The low-pressure testing device as claimed in claim 1, wherein the two resilient tubes are parallel.

6. A low-pressure testing device for an automobile tire, the low-pressure testing device consisting of:
    a flat, rectangular base with a long front and rear edge and two shorter end edges firmly placed on the ground;
    a warning device mounted on one end of the base and having a switch and a warning circuit; and
    two separated resilient tubes each of which has a first closed end and a second end connected to the switch;
    whereby when the two tubes are pressed simultaneously, the switch closes the warning circuit to sound an alarm.

7. The low-pressure testing device as claimed in claim 6, wherein the resilient tubes are filled with air and the switch is a pressure switch so that when the resilient tubes are pressed simultaneously, the air inside the resilient tubes is compressed and activates the switch to close the warning circuit.

8. The low pressure testing device as claimed in claim 7 further comprising multiple parallel resilient sleeves mounted on top of the base to hold the two resilient tubes.

9. The low-pressure testing device as claimed in claim 6 further comprising multiple resilient sleeves mounted in parallel on top of the base to hold the two resilient tubes.

10. The low-pressure testing device as claimed in claim 6, wherein the two resilient tubes are parallel.

* * * * *